United States Patent [19]

Vasile et al.

[11] Patent Number: 5,289,523
[45] Date of Patent: Feb. 22, 1994

[54] TELECOMMUNICATIONS RELAY SERVICE METHOD AND APPARATUS

[75] Inventors: Karen L. Vasile, Bedminster; Leonard R. Kasday, Moorestown, both of

[73] Assignee: AT&T Bell Laboratories, Murray Hill, N.J.

[21] Appl. No.: 923,294

[22] Filed: Jul. 31, 1992

[51] Int. Cl.⁵ ............... H04M 11/00; H04M 1/64; H04M 3/00
[52] U.S. Cl. ............... 379/52; 379/265; 379/309; 379/88
[58] Field of Search ............... 379/52, 265, 266, 308, 379/309, 88, 89, 67, 201, 96

[56] References Cited

U.S. PATENT DOCUMENTS 4,430,726  2/1984  Kasday ............... 364/900
5,163,081  11/1992 Wycherley et al. ......... 379/265

FOREIGN PATENT DOCUMENTS 2183880  6/1987  United Kingdom ........... 379/52

OTHER PUBLICATIONS

The article "User Interface for Audio Communication System", IBM Technical Disclosure Bulletin, vol. 25 No. 7A Dec. 1982 pp. 3371-3377.
Pending U.S. Application, Wycherley 1-1 filed Nov. 5, 1990, bearing Serial No. 07/609353, allowed Jun. 11, 1992.

Primary Examiner—Jin F. Ng
Assistant Examiner—Jason Chan
Attorney, Agent, or Firm—Eugene J. Rosenthal; James J. Trainor

[57] ABSTRACT

In a telecommunications relay system employing automated text-to-speech for conversion of a text message entered by a sound impaired person, the delay between the completion of the automated text-to-speech conversion and the assignment of a live shared attendant for transcribing and transmitting that which the unimpaired person says is eliminated by completing the text-to-speech conversion for each text message and its associated end-of-message code word without the introduction of any delay and, immediately thereafter, accepting and storing the unimpaired person's speech into a voice buffer at least until a live attendant is assigned to the relay session. When an attendant is eventually assigned to the call, the attendant retrieves the speech stored in the buffer. Should the assigned live attendant transcribe all of the speech that was stored in the buffer, which may include speech after the attendant's assignment to the call, the live attendant may be linked to the unimpaired party to continue the speech to text transcription such that the buffer introduces essentially no delay in the transmission of the speech to the live attendant.

21 Claims, 4 Drawing Sheets

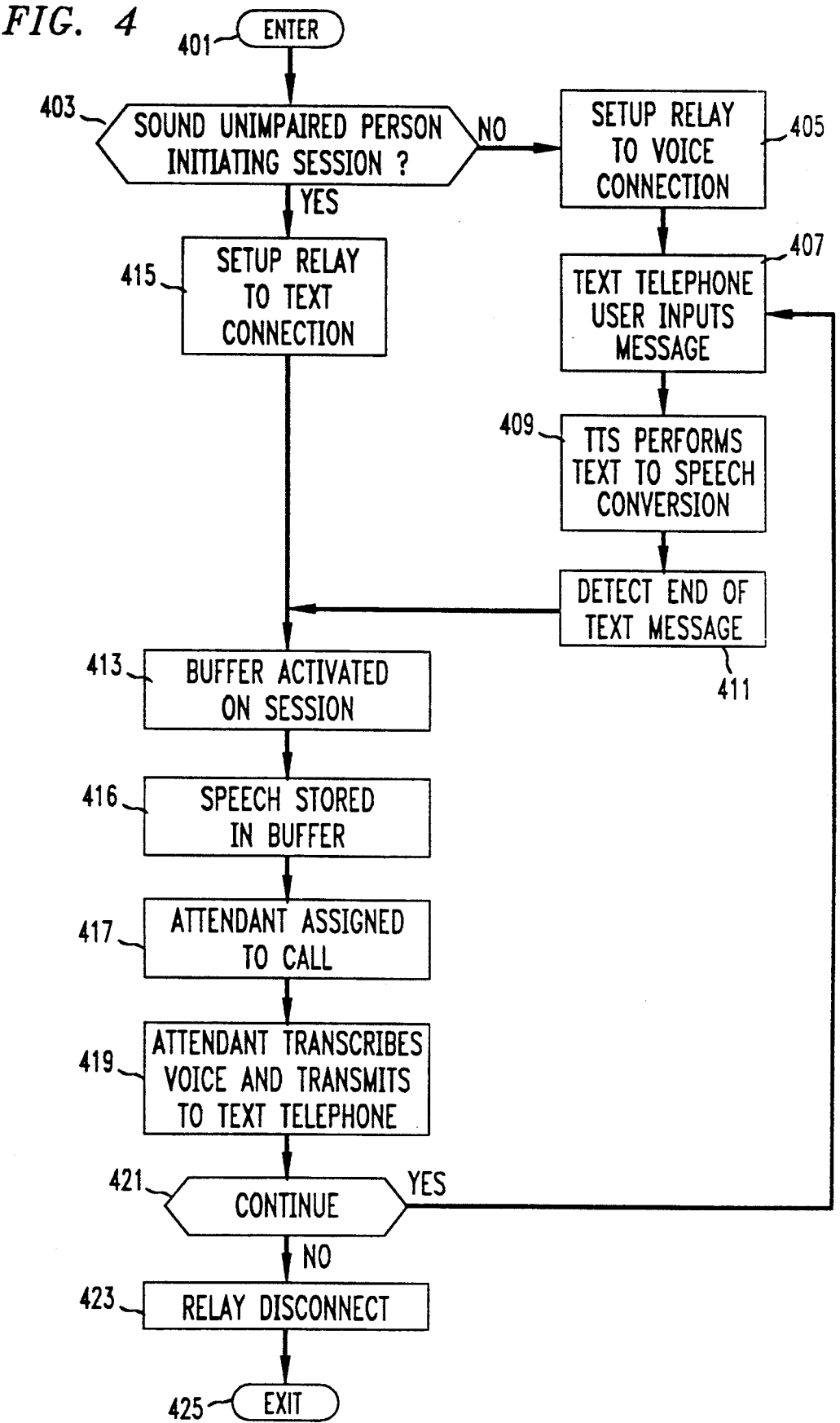

TELECOMMUNICATIONS RELAY SERVICE METHOD AND APPARATUS

TECHNICAL FIELD

This invention relates to the processing of communication sessions between sound impaired persons and individuals who are not sound impaired.

BACKGROUND OF THE INVENTION

Telecommunications relay service allows a sound impaired person, i.e., a hearing or speech impaired individual, to employ a data-type terminal for engaging in a communication session over a telephone network with a sound unimpaired person who does not have a matching terminal but instead has a telephone station set for use in voice based communication. Telecommunications relay service is well known and was formerly called dual party relay (DPR) service. Such service is currently provided by having a live attendant, i.e., a communications assistant, dedicated to each relay session. The live attendant a) reads over the telephone to the unimpaired person text messages that are transmitted to the attendant by the sound impaired person using the data-type terminal and b) transcribes and transmits to the sound impaired person the text of that which he hears being spoken by the unimpaired person. The terminal employed may be a unit such as: a) a personal computer, b) a data terminal or c) a text telephone, which was formerly known as a telecommunications device for the deaf (TDD).

It has been recognized in the art that one of the functions performed by the live attendant can presently be automated; namely, that text-to-speech systems can be employed to speak to the unimpaired person the text messages that are input by the sound impaired person. Therefore, the functions performed by such a live attendant are reduced and, correspondingly, the time required to perform the attendant's job is reduced. In fact, such systems can detect a code word used to indicate the end of a text message and only summon the live attendant upon such detection.

As a result, telecommunications relay service systems will shortly be deployed in which a live attendant may be shared over several such relay sessions. If there is more than one live attendant they may be grouped in a pool from which each may be assigned, on an as needed basis, to perform transcription for any relay session that is in progress and for which an automated text-to-speech conversion has just completed. Such attendants may be assigned in a fashion similar to that employed to assign transcribers disclosed in U.S. Pat. No. 4,430,726 issued on Feb. 7, 1984 to L. R. Kasday, which is incorporated herein by reference.

It is recognized that a delay, lasting up to a minute or longer, may result between the completion of the automated text-to-speech conversion and the assignment of a live shared attendant for transcribing and transmitting that which the unimpaired person says. This delay in assigning an attendant to an established relay session requires the unimpaired person to wait before he speaks after completion of the text-to-speech conversion, until he is certain that one of the shared attendants is assigned to his relay session. If the unimpaired person does not wait until one of the shared attendants is assigned to his relay session, part of what he says will not be heard by the attendant ultimately assigned and will, consequently, be lost. Because the unimpaired person typically wishes to begin speaking as soon as the text-to-speech conversion is completed, which is the natural impulse of persons involved in conversations, such a delay is undesirable. In fact, such a delay can cause a) consternation to the unimpaired person or b) loss of that which the unimpaired person said, should he the forget the existence of such a delay and begin speaking immediately upon completion of the text-to-speech conversion.

In at least one prior art system, the text-to-speech conversion of the code word indicating the end of the textual message is delayed until one of the shared live attendants is assigned to the relay session. Such a system is designed to avoid one of the effects of the delay, that of the speaking by the sound unimpaired person before a live attendant is assigned to the session. The delay itself, however, is not eliminated. In fact, the delay is still perceivable by the sound unimpaired person as the lag between the time he stops hearing the spoken version of the text message and the time he is hears the code word. As a result, such a prior art system merely shifts the point at which the other effect of the delay, the annoyance, is encountered from the time after completion of all text-to-speech conversion but before an attendant is assigned to the time between completion of the text-to-speech conversion of the text message and the text-to-speech conversion of the code word.

SUMMARY OF THE INVENTION

In accordance with the principles of the invention, the perception of the aforementioned delay by the sound unimpaired person is eliminated by completing the text-to-speech conversion for each text message and its associated end-of-message code word without the introduction of any noticeable delay and, substantially immediately thereafter, accepting and storing the unimpaired person's speech into a voice buffer at least until a live attendant is assigned to the relay session. When a live attendant is eventually assigned to the call, the attendant retrieves the speech stored in the buffer. Should the assigned live attendant transcribe all of the speech that was stored in the buffer, which may include speech after the attendant's assignment to the call, the live attendant may be linked to the unimpaired party to continue the speech to text transcription "in real time" such that the buffer is either not employed or it is configured to introduce essentially no delay in the transmission of the speech to the live attendant.

Advantageously, the utilization of a speech buffer permits the time between the completion of the text-to-speech conversion and the assignment of a live attendant to be increased without impeding upon the interactive nature and natural flow of the conversation. Therefore, fewer live attendants are necessary and, consequently, the system realizes a further reduction in labor expense.

BRIEF DESCRIPTION OF THE DRAWING

In the drawing:

FIG. 4 shows the process performed in the relay center shown in FIG. 3, in accordance with the principles of the invention.

DETAILED DESCRIPTION

Figure 1:
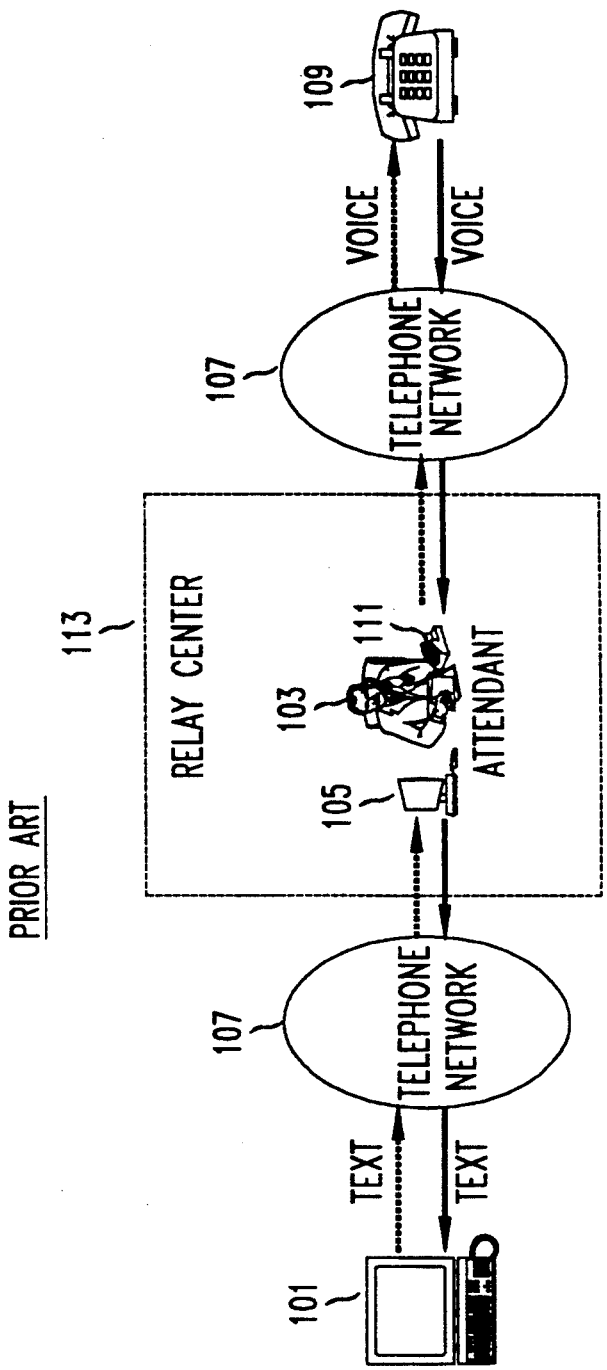
FIG. 1 shows a simplified representation of the currently deployed, prior art, telecommunications relay service.

FIG. 1 shows a simplified representation of the currently deployed, prior art, telecommunications relay service. A sound impaired person employs text telephone 101 to establish a first connection for a communications relay session, which is a data link with live attendant 103, who employs compatible text telephone 105. The communications relay session is established over telephone network 107. Attendant 103 determines with whom the sound impaired person desires to communicate and establishes the second connection for the communications relay, which is a voice telephone link, from telephone station set 111 to the desired person at telephone station set 109. It is noted that the connections of the communications relay could be established in reverse order, i.e., the establishment of a voice telephone link first, followed by a data link between text telephones 105 and 101.

Regardless of which connection is initiated first, communication proceeds by alternating seriatim between the following two phases. In the first phase, a text message is input to text telephone 101 by the sound impaired person. Upon concluding the inputting of the text message, the sound impaired person inputs a predetermined end-of-message code word, such as "GA", which stands for "go ahead", indicating he has completed his message. The text message appears at terminal 105 of attendant 103 who reads aloud the message into telephone station set 111, thereby relaying it, so that that which was input as the message by the sound imparied person can be heard by the unimparied person at telephone station set 109.

When the unimparied person at telephone station set 109 hears the code word indicating the end of the message, e.g., "GA" or "go ahead", he begins the second phase of the communications relay by speaking his own message into telephone station set 109. The attendant hears, via telephone station set 111, that which is spoken by the unimparied person and transcribes it into terminal 105 for transmission to text telephone 101. When the unimpaired person has finished speaking his message, he speaks the end-of-message code word. The sound impaired person reads the message, as transcribed by the attendant, at terminal 101. When he reads the end-of-message code word, the sound impaired person may again begin the first communication phase and enter a new message. Upon agreement of the parties, as indicated by their sending of appropriate messages, the relay session is ended by the unimpaired person going on hook at telephone station set 109 and the sound impaired person disconnecting text telephone 101 from telephone network 107.

Figure 2:
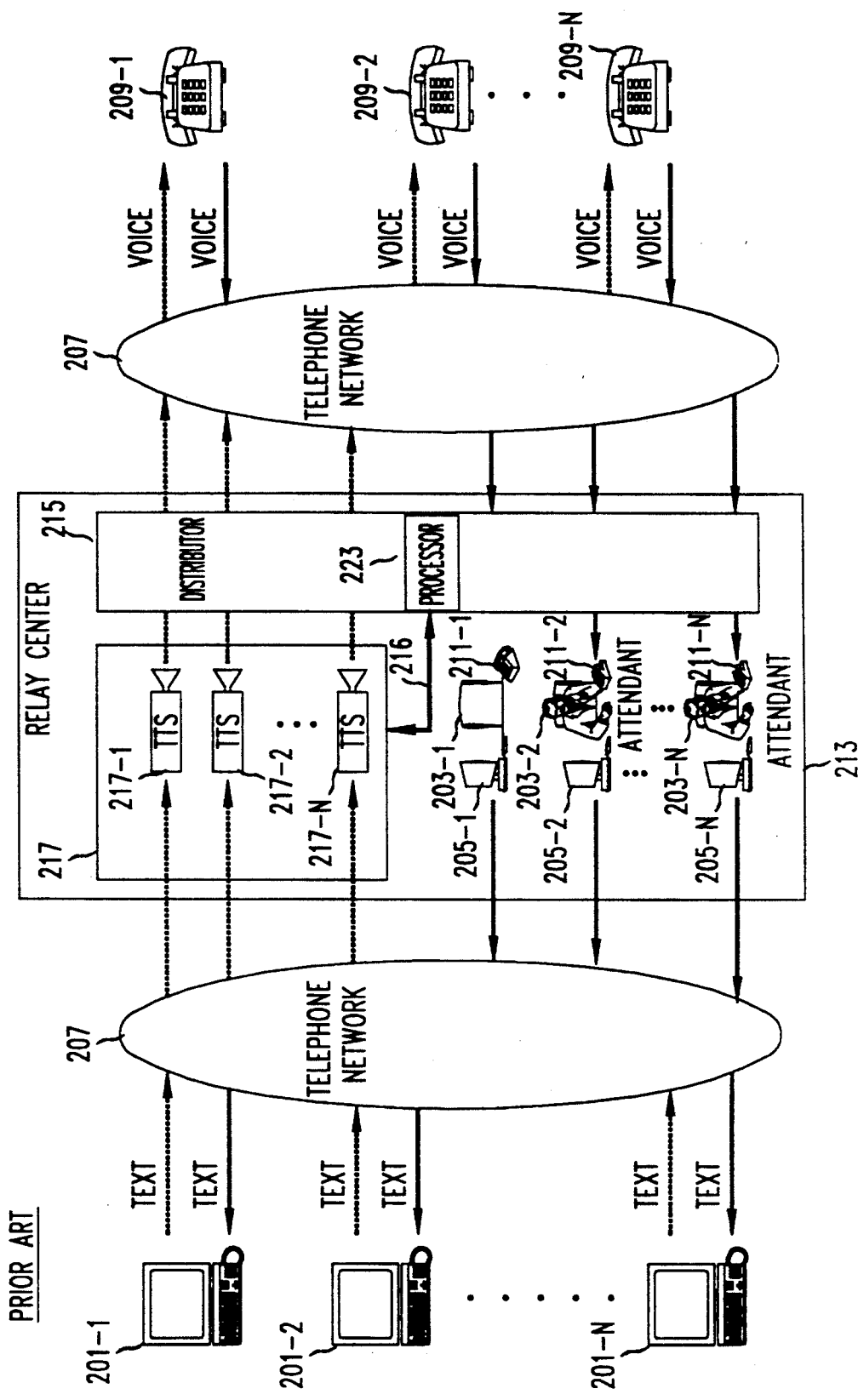
FIG. 2 shows a simplified representation of a prior art telecommunications relay service that employs automated text-to-speech conversion.

FIG. 2 shows a simplified representation of a telecommunications relay service that employs automated text-to-speech conversion. Such systems are known in the art and are expected to be deployed in the field shortly. For example, see copending application Ser. No. 07/609,353 entitled Automated Dual Party Relay System Filed on Nov. 5, 1990, assigned to the same assignee as the present application (case Wycherley 1-1), and allowed on Jun. 11, 1992 which is incorporated herein by reference. Shown are text telephones 201, including text telephones 201-1 through 201-N, and telephone stations sets 209, including telephone station sets 209-1 through 209-N, which can be interconnected via telephone network 207 and relay center 213 to establish telecommunication relay sessions. For clarity, each direction of communication is shown separately.

As described in connection with FIG. 1, a sound impaired person at one of text telephones 201 (FIG. 2), e.g., text telephone 201-1, initiates the establishment of a relay session. After establishment of the session, each message input by the sound impaired person is routed to one of text-to-speech conversion units (TTS) 217-1 through 217-N, e.g., text-to-speech conversion unit (TTS) 217-2. Text-to-speech conversion unit (TTS) 217-2 converts the message into speech and causes the spoken equivalent of the message to be communicated over telephone network 207 to one of telephone station sets 209, e.g., telephone station set 209-N, at which the unimpaired individual with whom the sound impaired person desires to communicate, is located. Upon the sound impaired person's completion of the inputting of his message at text telephone 201-1, he inputs the predetermined code word, e.g., "GA", at the end of the message text. Text-to-speech conversion unit (TTS) 217-2 detects the "GA" code word but does not speak it. Instead, in response thereto, it signals distributor 215, via link 216, that one of attendants 203 is required for the next phase of the relay session.

Distributor 215 attempts to locate an available one of attendants 203, i.e., an attendant that is both present at an attendant station and is not currently actively engaged in transcribing voice messages from another relay session. If distributor 215 locates an available attendant, it assigns that attendant to the relay session for which "GA" has just been detected. After the assigning of an attendant, text-to-speech conversion unit (TTS) 217-2 speaks either "GA" or an expanded version of "GA", i.e., "go ahead". Thus, in such a prior art arrangement, there may be a delay, which is not insignificant from the point of view of the unimpaired person, in assigning the attendant after the detection of the end-of-message code word "GA" and before "GA" is relayed to the unimpaired person.

Once the unimpaired person hears the "GA", he recognizes that one of attendants 203 has been assigned to his relay session. Therefore, the second communication phase can begin, with the unimpaired person speaking a message for the sound impaired person. The speech comprising the message is heard by the assigned attendant, via his one of telephone station sets 211, and the attendant transcribes and transmits, via his one of text telephones 205, a textual representation of what he heard. Upon the speaking of "GA" or saying of "go ahead" by the unimpaired person, the attendant transcribes and transmits "GA" to the sound impaired person and a text-to-speech conversion unit is placed on line in the relay session to again begin the first phase.

Figure 3:
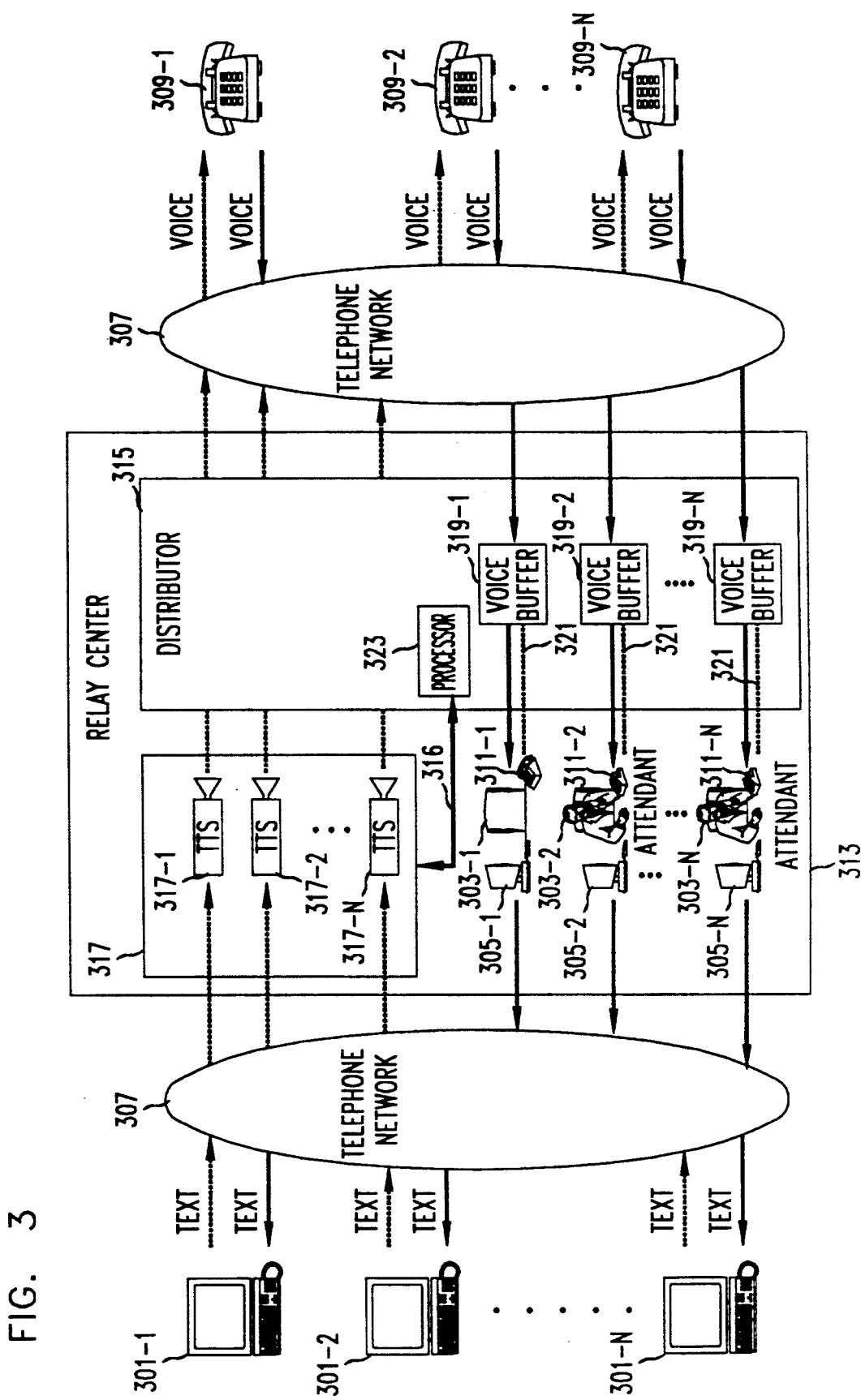
FIG. 3 shows a representation of a telecommunications relay service that employs automated text-tospeech conversion and voice buffers, in accordance with the principles of the invention.

FIG. 3 shows a representation of a telecommunications relay service that employs automated text-to-speech conversion and voice buffers, in accordance with the principles of the invention. Text telephones 301, including text telephones 301-1 through 301-N, and telephone stations sets 309, including telephone station sets 309-1 through 309-N, can be interconnected via telephone network 307 and relay center 313 to establish telecommunication relay sessions in a manner similar to that described for the prior art shown in FIG. 2. For clarity, each direction of communication is shown separately. Again, as described for FIG. 1, a sound impaired person at one of text telephones 301 (FIG. 3), e.g. text telephone 301-1, initiates the establishment of a relay session.

After establishment of the session, each message input by the sound impaired person is routed to one of text-to-speech conversion units (TTS) to 317-1 through 317-N, e.g. text-to-speech conversion unit (TTS) 317-2. Text-to-speech conversion unit (TTS) 317-2 converts the message into speech and causes the spoken equivalent of the message to be communicated over telephone network 307 to one of telephone station sets 309, e.g., telephone station set 309-N. Upon the sound impaired person's completion of the inputting of his message at text telephone 301-1, he inputs the predetermined code word, e.g., "GA", at the end of the message text.

Text-to-speech conversion unit (TTS) 317-2 detects the "GA" and, in accordance with an aspect of the invention, immediately speaks it, or its expanded version "Go ahead", to the unimpaired person at telephone station set 309-N. In addition, in accordance with the principles of the invention, in response to receipt of the "GA", text-to-speech conversion unit (TTS) 317-2 causes one of voice buffers 319-1 through 319-N, e.g., voice buffers 319-N, to activate by clearing itself and beginning to record any sounds on the telephone line associated with the unimpaired person. Therefore, any speech spoken by the unimpaired person will be stored in the voice buffer, after the saying of "go ahead". As a result, without waiting for one of attendants 303 to be assigned to the relay session, the unimpaired person may begin speaking his message immediately and his speech will not be lost. Consequently, there is no delay introduced between the speaking of the substance of the message of the first communication phase and the begining of the second communication phase.

After activation of the voice buffer, text-to-speech conversion unit (TTS) 317-2 signals distributor 315 that one of attendants 303 is required for the next phase of the relay session. Distributor 315 attempts to locate one of attendants 313 that are not currently actively engaged in transcribing voice messages from other relay sessions. If distributor 315 locates an available attendant, it assigns that attendant to the relay session for which "GA" has just been detected and a buffer activated.

As described above in connection with the prior art system shown in FIG. 2, there may be a delay after the detection of "GA" before distributor 315 locates and assigns an available attendant to the relay session. If it were detectable by the unimpaired person, the length of this delay would not necessarily, as noted, be insignificant, from the unimpaired person's point of view. However, since that which the unimpaired person says is stored in the voice buffer, in accordance with the principles of the invention, advantageously, the presence of any delay in assigning an attendant is masked from him and he can begin speaking immediately after hearing "GA" from the one of text-to-speech conversion units 317.

Voice buffers 319, which may be digital voice buffers, are typically configured to operate in a first in, first out mode. They are similar to tapeless, digital answering machines. Voice buffers 319 can be implemented in a myriad of ways well known to those skilled in the art. For example, each one of voice buffers 319 can be a distinct physical unit or they could be logical units in a centralized buffer system. Furthermore, voice buffers 319 may be implemented using their own dedicated hardware or using hardware shared with other elements of relay center 313.

Each attendant 303 can retrieve the unimpaired person's spoken messages from voice buffers 319, by extending control signals over lines 321, which pass through distributor 315. Lines 321 may simply be the reverse voice path and the control signals may be signals such as a) dual tone multi-frequency signals, b) switch hook flashes or c) dial pulses generated by telephone station sets 311. The attendant may use the control signals to speed up or slow down the rate of the play out from voice buffers 309 as well as to review their contents. It is noted that the control signals and lines 321 need not pass through distributor 315 so long as they reach from attendants 303 to voice buffers 319. Once one of voice buffers 319 is empty, it can, in accordance with an aspect of the invention, operate in a pass-through mode or a bypass mode, thereby allowing what was spoken by the unimpaired person to be heard by the assigned attendant with essentially no delay.

The speech comprising the unimpaired person's message for the second phase of communication is heard by the assigned one of attendants 303, via his one of telephone station sets 311, and the attendant transcribes and transmits, via his one of text telephones 305, a textual representation of what he heard. Upon hearing the "GA" spoken by the unimpaired person a) the assigned one of attendants 303 transcribes and transmits "GA" to the sound impaired person, b) buffering of the voice of the unimpaired person is discontinued and c) a text-to-speech conversion unit is placed on line in the call to begin again the first phase of communication.

It is noted that voice buffers 319 are shown as part of distributor 315 for clarity of exposition only and need not be so incorporated. Voice buffers 319 may be implemented in any manner such that the incoming voice from one of telephone station sets 309 may be stored therein while at the same time voice already stored therein can be played out to one of attendants 311. Also, processor 323 controls the overall operation of relay center 313. It, too, is shown as part of distributor 315 for clarity of exposition only and need not be so incorporated.

FIG. 4 shows the process performed in relay center 313 (FIG. 3), in accordance with the principles of the invention. The process is entered in step 401 (FIG. 4), when relay center 313 detects that a communication relay session is to be established. Next, conditional branch point 403 tests to determine if the unimpaired person is initiating the relay session. If the test result in step 403 is NO, indicating that the call is being initiated by a sound impaired person from one of text telephones 301 (FIG. 3), control passes to step 405 (FIG. 4) in which the relay to voice connection of the session is set-up by placing a telephone call to an unimpaired person at one of telephone station sets 309 (FIG. 3) over telephone network 307. Also, one of text-to-speech conversion units (TTS) 317 is assigned to receive text, input by the sound impaired person, for conversion into speech perceptible by the unimpaired person.

Next, in step 407 (FIG. 4), the first phase of communication is begun when the sound impaired person at text telephone 301-1 inputs his message. In step 409, the text-to-speech conversion unit (TTS) performs text to speech conversion of the inputted message. In step 411, the end of the text message, e.g., "GA", is detected and "Go ahead" is spoken by the text-to-speech conversion unit to the unimpaired person. Thereafter, control passes directly to step 413.

If the test result in step 403 is YES, i.e., the unimpaired person initiated the telephone relay session, control passes to step 415 in which the relay to text connection is set up, i.e., a data link is established from relay center 313 to the sound impaired person's one of text telephones 301. Thereafter, control passes directly to step 413.

In accordance with the principles of the invention, in step 413, one of voice buffers 319 (FIG. 3) is activated to collect and store that which will be spoken by the unimpaired person. In accordance with an aspect of the invention, the buffer may be cleared upon it activation. This allows the attendant to easily locate the beginning of the message. Control passes to step 416 (FIG. 4), in which any speech spoken by the unimpaired person is stored in the voice buffer until it can be transcribed and transmitted by an attendant. Next, control passes to step 417, in which an attendant is assigned to the relay session as soon as one becomes available. Again, although there may be a delay in assigning an attendant to a relay session after the completion of the text message from the sound impaired person, advantageously, because of the use of the voice buffer, such a delay is not perceived by the unimpaired person who may begin to speak immediately thereafter. Note that the speech storage of step 416 continues to be performed concurrently with the performance of step 417.

In step 419, the attendant transcribes the voice message spoken by the unimpaired person and transmits the corresponding text to the sound impaired person's text telephone. Again, note that the speech storage of step 416 continues to be performed concurrently with the performance of the transcription in step 419. The attendant transcribes the voice message until he hears an end-of-message or end-of-session code word. Thereafter, control passes to step 421.

Typically, once assigned, an attendant can transcribe and transmit that which is spoken by the unimpaired person faster than the rate at which the unimpaired person continues to speak and can, therefore, "catch up" to the speaking person. This is because the unimpaired person typically pauses during his speaking for the purpose of thinking of what to next say. Catching up is also facilitated by permitting the attendant to speed up the play out from the buffer to a rate that is faster than the rate at which the speech was stored in the buffer. Therefore, advantageously, most often, by employing a voice buffer no additional time is taken to convey to the sound impaired person the complete text version of the message spoken by the unimpaired person. Furthermore, once the attendant catches up, by emptying the voice buffer, there is essentially no delay between the speaking of the message by the unimpaired person and the hearing of the message by the attendant.

Conditional branch point 421 tests to determine if the relay session should be continued, i.e., both parties have not indicated "SK", a code word meaning sign-off. If the test result in step 421 is YES, control passes back to step 407. The buffering may also be discontinued at this point. If the test result is NO, control passes to step 423, in which the relay session is disconnected. Thereafter, the process exits via step 425.

It is noted that the connections of the communications relay could be established in reverse order, i.e., the establishment of a voice telephone link first between one of telephone station sets 309 and telephone station sets 311, followed by a data link between one of text telephones 305 and 301.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in a system for processing communication sessions over a telephone network between sound impaired and unimpaired persons, during which at least one live attendant transcribes and transmits to the sound impaired person that which is spoken by the unimpaired person and an automated text-to-speech system converts into speech to be heard by the unimpaired person that which is input by the sound impaired person, said at least one live attendant being free to perform other tasks during said text-to-speech conversion, said method characterized by buffering that which is spoken by the unimpaired person from at least the time of completion of a text-to-speech conversion by said text-to-speech system until an assignment, at some time thereafter, of said at least one live attendant for transcribing and transmitting to said sound impaired person that which is spoken by said unimpaired person.

2. The invention as defined in claim 1 wherein said buffering is discontinued each time said text-to-speech system begins a text-to-speech conversion and is restarted with an empty buffer upon the completion of each text-to-speech conversion.

3. The invention as defined in claim 1 wherein said buffering continues for new speech spoken by the unimpaired person while said at least one live attendant transcribes and transmits that which has previously been buffered.

4. Apparatus for use in a system for providing telecommunications relay service in which an automated text-to-speech system converts into speech to be heard by a sound unimpaired person that which is input by a sound impaired person, said apparatus including:
   means for detecting when said sound impaired person is finished inputting; and
   means for buffering, from the time that the sound impaired person finished inputting until at least the time at which a live attendant is next assigned to a call for transcribing and transmitting to said sound impaired person, speech that is spoken by said unimpaired person.

5. The invention as defined in claim 4 further including means for clearing said buffering means in response to detection that said sound impaired person is finished inputting.

6. The invention as defined in claim 4 wherein said buffering means is adapted to supply speech stored therein as an output.

7. The invention as defined in claim 6 wherein said buffering means is adapted to receive for buffering speech spoken by said unimpaired person while supplying as an output speech that was previously stored in said buffering means.

8. The invention as defined in claim 6 wherein said buffering means is adapted to supply any speech stored therein at a rate different than the rate at which said speech is received for buffering.

9. The invention as defined in claim 8 wherein said rate is responsive to predetermined control signals.

10. The invention as defined in claim 6 wherein said buffering means is adapted to repeatedly supply a predetermined portion of the speech stored therein as an output.

11. The invention as defined in claim 10 wherein the predetermined portion is repeated under the control of said live attendant.

12. A method for use in a system of the type in which a sound impaired and an unimpaired person can engage in a communication session over a telephone network by alternating seriatim between first and second phases, wherein a) in said first phase, said sound impaired person inputs via a terminal that which he wishes to communicate to said unimpaired person and an automated text-to-speech system causes an audible representation of said input to be supplied to said unimpaired person, said unimpaired person thereafter waits until a live attendant is assigned to said communication session so that said second phase can begin and, b) in said second phase, said unimpaired person speaks to said live attendant that which he wishes to communicate to said sound impaired person and said live attendant transcribes and transmits to said terminal that which was spoken by said unimpaired person so that said sound impaired person can perceive that which was transmitted, the method comprising:

storing in a buffer, representations of any speech received from said unimpaired person immediately after completion of said first phase at least until the time that said live attendant is assigned to said session so that said second phase substantially immediately follows said first phase without any waiting for said live attendant to be assigned to said communication session.

13. The invention as defined in claim 12 wherein said buffering is discontinued each time said first phase begins and is restarted with an empty buffer upon the completion of each said second phase.

14. The invention as defined in claim 12 further including the step of supplying as an output, when said live attendant is assigned to said session, representations previously stored in said buffer.

15. The invention as defined in claim 14 wherein said buffering step continues concurrently with said supplying step, said representations supplied in said supplying step being delayed versions of representations previously stored in said storing step.

16. The invention as defined in claim 12 wherein further including the step of detecting the end of said first phase and wherein said buffering is begun in response said detection.

17. A method for use in a telecommunications relay system comprising the steps of:
 a. receiving text transmitted from a data-type terminal;
 b. automatically converting said text into speech;
 c. detecting in said text an end of message indicator;
 d. storing a representation of speech received from a telephone station set in a buffer, said storing beginning in response to said detection of said end of message indicator;
 e. supplying the contents of said buffer as an output to be heard as speech by an attendant; and
 f. transmitting, to said data-type terminal, text transcribed by said attendant, said transcription being based on the output of said buffer as heard by said attendant.

18. The invention as defined in claim 17 wherein said transcription continues until said attendant hears said end of message indicator and further including the step of:
 g. repeating steps (a) through (f).

19. The invention as defined in claim 17 wherein said supplying step follows said storing step so that the representation of speech stored in said buffer in said storing step is supplied from said buffer in said supplying step without any perceivable delay.

20. The invention as defined in claim 17 wherein said storing step and said supplying step are concurrently performed.

21. The invention as defined in claim 20 wherein said speech being received into said buffer in said storing step at a particular time is different than the speech represented by the buffer contents being supplied as the output in said supplying step at said particular time.

* * * * *